United States Patent
Vaidyanathan et al.

(10) Patent No.: US 8,158,045 B2
(45) Date of Patent: Apr. 17, 2012

(54) METHOD FOR MANUFACTURING LIGHTNING STRIKE MITIGATION COMPOSITES

(75) Inventors: K. Ranji Vaidyanathan, Stillwater, OK (US); Jeffrey Campbell, Tucson, AZ (US)

(73) Assignee: BAE Systems Unmanned Aircraft Programs Inc., Tucson, AZ (US)

( * ) Notice: Subject to any disclaimer, the term of this patent is extended or adjusted under 35 U.S.C. 154(b) by 296 days.

(21) Appl. No.: 12/177,005

(22) Filed: Jul. 21, 2008

(65) Prior Publication Data

US 2009/0075088 A1     Mar. 19, 2009

Related U.S. Application Data

(60) Provisional application No. 60/951,058, filed on Jul. 20, 2007.

(51) Int. Cl.
*B29C 39/02*     (2006.01)
*B29C 41/20*     (2006.01)

(52) U.S. Cl. ........ 264/250; 264/255; 264/129; 264/344; 264/347

(58) Field of Classification Search ........................ None
See application file for complete search history.

(56) References Cited

U.S. PATENT DOCUMENTS 6,001,207 A * 12/1999 Enlow et al. .................. 156/230

FOREIGN PATENT DOCUMENTS

JP     05031808    *    2/1993

* cited by examiner

*Primary Examiner* — Edmund H. Lee
(74) *Attorney, Agent, or Firm* — Banner & Witcoff, Ltd.

(57) ABSTRACT

A method for manufacturing a composite material utilizes a tooling material having a desired shape. The surface of the tooling material is coated with a composite film that includes a conductive filler material. A composite composition is introduced into contact with the surface of the tooling material to form a desired shape. The composite composition is processed to produce the composite material, and the composite material has a conductive composite surface layer that includes the conductive filler material.

20 Claims, 9 Drawing Sheets

METHOD FOR MANUFACTURING LIGHTNING STRIKE MITIGATION COMPOSITES

CROSS-REFERENCE TO RELATED APPLICATION

This application claims the benefit of priority of the filing date of U.S. Provisional Patent Application Ser. No. 60/951,058, filed on Jul. 20, 2007, which is incorporated herein by reference and made part hereof.

FEDERALLY SPONSORED RESEARCH

Research related to this application was conducted in connection with NASA Phase I SBIR Contract No. NNL07AA73P.

TECHNICAL FIELD

The invention relates to composites having enhanced lightning strike mitigation properties and electromagnetic interference shielding capabilities, and methods for the production therefor.

BACKGROUND OF THE INVENTION

Materials for protection against electromagnetic interference (EMI) and/or lightning strike mitigation are useful in a number of applications, and are commonly used, for example, in airplanes and other aircraft. Traditionally, metals are used for protection against EMI AND/or for lightning strike mitigation because of their high conductivity, but are often undesirable because of their weight and machinability constraints. Over the last few years, this problem has been addressed through development of light weight conductive polymers, either by synthesizing intrinsically conducting polymers (ICP) or by the inclusion of conductive fillers (e.g., carbon black, carbon fibers, carbon nanotubes) in insulating matrices. However, the shielding effectiveness (SE) of these materials and lightning strike mitigation capability is not as high as that of metals, even with the inclusion of high volume fractions of conductive fillers in such polymers. Also, addition of high volume fractions of filler in a composite results in difficulty of manufacture and degradation in toughness and ductility.

One current composite approach uses 100 microns of copper wire in every graphite tow throughout the structure. This method suffers drawbacks due to the additional weight gain of 60 grams per square meter. This can add up to 500-1000 pounds to the overall aircraft. In addition, the conducting material evaporates after a single lightning strike, which leads to high repair costs.

In the case of conductive filler-filled insulating polymers, connectivity of filler particles is not as important for EMI shielding as for electrical conductivity (important for lightning strike mitigation), but the shielding effectiveness improves with a network formation because of enhanced conductivity increases the reflective capacity of the shield. Though carbon is an intrinsically conducting material (10-$10^3$ S/m), only high volume fractions of carbon black or short carbon fibers can make any insulating polymer matrix conductive enough to avoid accumulation of charge and to form a connecting and conducting network.

Composites have been manufactured containing SWNTs using a spraying technique. More specifically, in one example, a mixture of 1-3 wt % SWNT is suspended in a solution of dimethylformamide (DMF) or alcohol, and the mixture was sprayed onto the surface of a prepreg or fabric. The resulting composite provided a 42% increase in EMI shielding, but little change in surface conductivity. Additionally, difficulties were encountered in maintaining a desired amount of SWNTs on the prepreg or composite surface. Other composites have been manufactured using nickel-coated SWNTs with the same spraying technique. By spraying nickel-coated SWNTs (1.5 wt %) onto the surface of a prepreg, surface conductivities of 6-10 orders of magnitude higher than the base composite can be established. However, the use of nickel coated SWNTs also decreases the EMI shielding effectiveness (SE) of the material. It is therefore desirable to produce a composite having both enhanced surface conductivity and enhanced EMI shielding effectiveness.

Aspects of the present invention are provided to solve the problems discussed above and other problems, and to provide advantages and aspects not provided by prior materials of this type. A full discussion of the features and advantages of the present invention is deferred to the following detailed description, which proceeds with reference to the accompanying drawings.

BRIEF SUMMARY

The present products and methods are provided to solve the problems discussed above and other problems, and to provide advantages and aspects not provided by prior products and methods of this type.

Aspects of the invention relate to methods for manufacturing a composite material using a tooling material having a desired shape. The surface of the tooling material is coated with a composite film that includes a conductive filler material. A composite composition is introduced into contact with the surface of the tooling material to form a desired shape. Then the composite composition is processed to produce the composite material, and the composite material has a conductive composite surface layer that includes the conductive filler material.

According to one aspect, the processing can be performed using a techniques such as autoclaving, curing, and vacuum assisted resin transfer molding. Additionally, the tooling material may be water-soluble, to permit the material to be washed away after the composite material is formed.

According to another aspect, the conductive filler material is a carbon-based material, such as single-walled carbon nanotubes. In one embodiment, the composite film includes at least about 60% single-walled carbon nanotubes.

According to a further aspect, the composite film may further include a polymer material, such as polyvinylpyrrolidone, polymethyl methacrylate, polyacrylonitrile, and/or polyvinyl alcohol. In one embodiment, this polymer material can be removed during processing. The composite film may further include a surfactant.

Additional aspects of the invention relate to methods for manufacturing a composite material, which begins with forming a green composite component using a composite composition. A composite film is introduced into contact with the surface of the green composite component, which composite film includes a polymer material and a conductive filler material. The composite composition is then processed to form a finished composite component, at a temperature sufficient to remove the polymer material from the composite film. The finished composite component has a conductive surface layer that includes the conductive filler material.

According to one aspect, the polymer material of the composite film can be a material such as polyvinylpyrrolidone, polymethyl methacrylate, polyacrylonitrile, and/or polyvinyl alcohol.

According to another aspect, the polymer material of the composite film includes polyvinylpyrrolidone, and the processing temperature is above 175° C. to effect removal of the polyvinylpyrrolidone.

Further aspects of the invention relate to composite material, which may be manufactured using the above-described techniques or other techniques. The component includes a composite base material and a conductive composite surface layer including a conductive filler material.

According to one aspect, the conductive filler material is a carbon-based material, such as single-walled carbon nanotubes.

According to another aspect, the component has a surface conductivity of between about 50 S/cm$^2$ and about 3230 S/cm$^2$.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

To understand the present invention, it will now be described by way of example, with reference to the accompanying drawings in which.

It is understood that the drawings, in some cases, may not be to scale.

DETAILED DESCRIPTION

While this invention is susceptible of embodiments in many different forms, exemplary embodiments of the invention are shown in the drawings and will herein be described in detail with the understanding that the present disclosure is to be considered as an exemplification of the principles of the invention and is not intended to limit the broad aspect of the invention to the embodiments illustrated.

Generally, the addition of certain carbon fillers to a composite, such as carbon nanotubes (CNT) or carbon nanofibers (CNF) has been found to improve electrical conductivity of polymer composites. Single walled carbon nanotubes (SWNT), one such filler, have excellent electrical, mechanical, and thermal properties. Not only do SWNTs have the capacity to achieve percolation at low levels, but the conductivity at percolation is also higher than that obtained with higher amounts of carbon black. However, due to processing difficulties (such as van der Waals forces between individual SWNTs in ropes and bundles), it is often difficult to utilize SWNTs in desired applications.

One exemplary method for manufacturing a composite having SWNTs on the surface thereof can be performed with the use of tooling materials, for example, the water soluble tooling materials described in U.S. Pat. No. 6,828,373, which is incorporated by reference herein and made a part hereof. Standard tooling, such as metal or rubber tooling, can also be used effectively with certain embodiments of the method described herein. Such tooling materials permit the manufacturing of filament-wound composite tanks and composite parts having complex shapes, and provides an excellent surface finish to such parts. Additionally, such tooling permits the insertion of inserts into the composite parts, such as sensors for monitoring various conditions. In one embodiment, the water soluble tooling materials can be manufactured from a water soluble polymer blend with a lightweight microsphere filler. The water soluble tooling material may be sealed with a coating, such as a polyvinylpyrrolidone (PVP) based sealant, to prevent resin from penetrating and cross-linking with the water soluble polymer. In the exemplary method for manufacturing a composite with a surface content of SWNTs, a composite film containing SWNTs can be used as a sealant on the tooling material, which is imparted to the surface of the composite during processing. A PVP-SWNT film can be produced having improved conductivity, strength, and modulus, as well as good handleability. The resultant composite surface can be produced with a similar or greater surface conductivity than the PVP-SWNT film after the composite processing. Other polymer carriers such as polymethylmethacrylate, polyacrylonitrile or similar polymers, which may be suspended in a suitable solvent, could also be used for creating the film or the spray.

Figure 1:
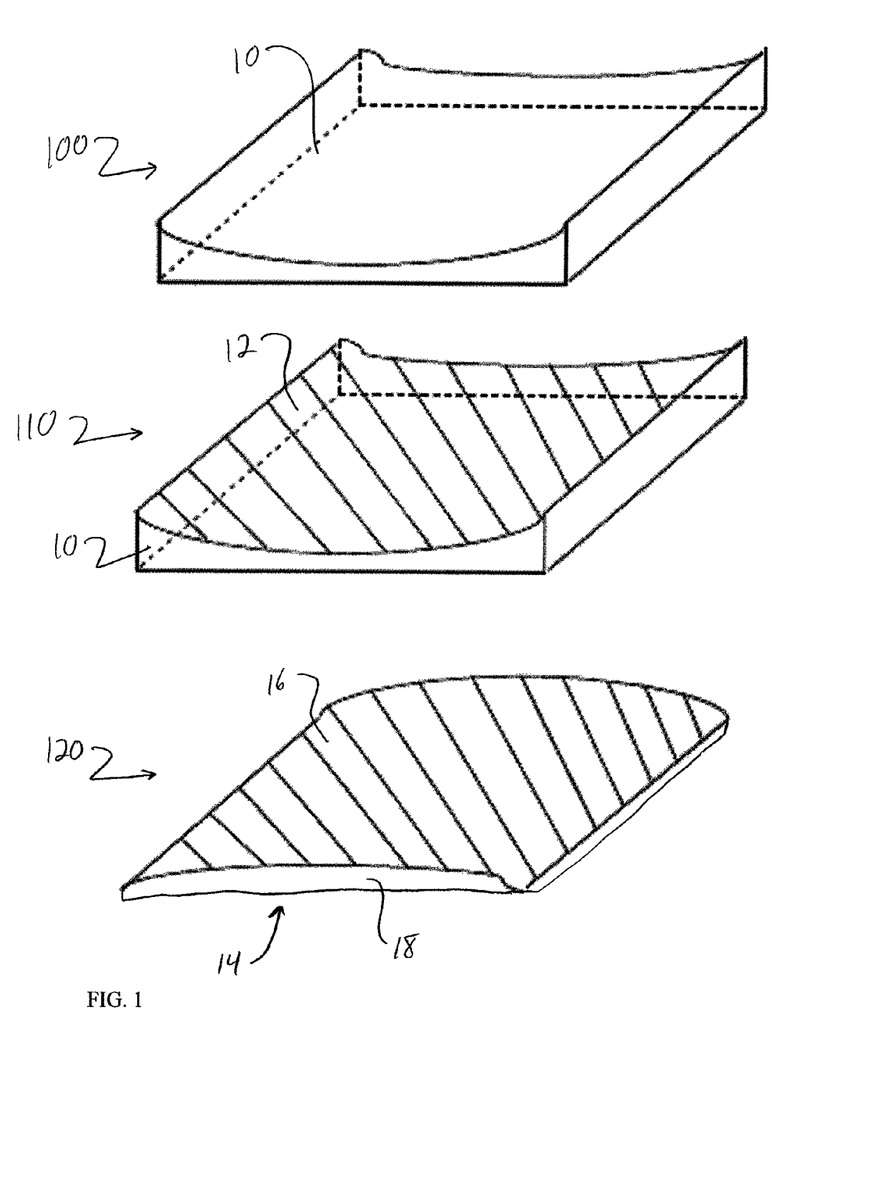
FIG. 1 is a schematic drawing illustrating a method for producing a composite having a surface layer containing a conductive filler material.

FIG. 1 illustrates one exemplary method for manufacturing a composite with a surface layer containing a conductive filler material. A water soluble tooling material 10 is manufactured to a desired profile, such as by machining, to achieve the desired shape of the finished product, at step 100. A film 12 is formed on the tooling material 10, generally containing at least a polymer and an amount of a conductive filler material (for example, SWNTs), at step 110. This film 12 can be formed by various methods, some of which are described below, including forming the film 12 separately and draping the film over the tooling material 10. Other methods of forming the film 12 may be used in other embodiments, including spraying the surface of the tooling material 10 with a suspension containing a polymer material and a filler material, which would be converted to the film 12 during processing. A composite composition then introduced into contact with the tooling material 10 and the film 12 during a forming technique. Typically, such a composite composition includes a matrix material and a fiber or insert material, such as those described herein. The tooling material 10 can be used with various forming techniques for polymer or composite structures, including, for example, the use of prepregs, vacuum assisted resin transfer molding (VARTM), filament winding, and other known techniques. The composite composition is processed, for example, through curing or autoclaving, and the tooling material is removed to produce the finished composite component 14. In the case of water soluble tooling material, the tooling material can be removed through the use of water.

During processing, at least part of the film 12 is imparted to the surface of the composite component 14. As a result, the composite component 14 has a composite base material 18 and a thin, conductive surface layer 16 containing the conductive filler material, at step 120. In one embodiment, part or all of the polymer material of the film 12 is imparted to the surface of the component 14, and in another embodiment, most or all of the polymer material of the film 12 is removed during processing and is not transferred to the surface of the component 14. In some embodiments, the surface conductivity of the part 14 may be higher when most or all of the polymer material is removed during processing. The removal of the polymer material during processing may depend at least in part on the evaporation temperature of the polymer compared to the processing temperature. Since PVP has a relatively low evaporation temperature (160-175° C.), the use of PVP in manufacturing the component 14 may facilitate complete removal of the PVP during processing. Polyacrylonitrile (PAN) and polymethyl methacrylate (PMMA) have processing temperatures of 320° C. and 210° C., respectively, and may require higher processing temperatures to effect complete removal. It is understood that if the component 14 undergoes post-processing or additional curing at higher temperatures, then polymers with higher melting/evaporation temperatures may be used and still be removed during processing. The conductive surface layer 16 of the finished composite 14 provides a highly conductive surface capable of providing enhanced lightning strike protection and EMI shielding. In one embodiment, the surface conductivity of the finished composite is between about 50 S/cm$^2$ and about 3230 S/cm$^2$. It is understood that additional steps known in the art of composite manufacturing may be included in the method. It is also understood that in other embodiments, the component 14 may be manufactured as a polymer component with a conductive surface layer.

Figure 2:
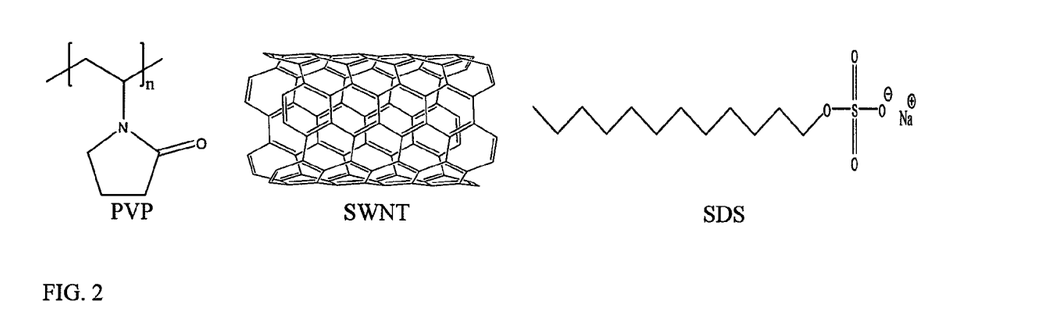
FIG. 2 is a drawing illustrating the chemical structures of polyvinyl pyrrolidone, a single-walled carbon nanotube, and sodium dodecyl sulfate.

In one example, the tooling material is coated with a conductive film containing polyvinyl pyrrolidone (PVP) and SWNTs. In such an embodiment, the PVP will evaporate at temperatures above 160° C. to 175° C., allowing the SWNTs to infuse onto the surface layer of the composite material to provide a conductive surface with improved lightning strike mitigation capability. In one embodiment, the conductive film contains up to about 40-80% SWNTs. In another embodiment, the conductive film contains at least 15% SWNTs. In a further embodiment, the conductive film contains greater than 60% SWNTs. It has been found that, in some embodiments, a larger component of conductive filler material will create a more conductive film and composite surface. A variety of different composite processing techniques can be used for processing a: composite with a PVP-SWNT film, such as prepreg, VARTM, filament winding, etc. These techniques can be used for many different composite systems with different polymer constituents, including, for example, vinyl esters, epoxies, polyimides, bismaleimide (BMI) and cyanate ester. In other examples, different polymers may be used in the conductive film, including, for example, polymethyl methacrylate (PMMA), polyacrylonitrile (PAN), and polyvinyl alcohol (PVA), or combinations of such polymers. Additionally, other conductive filler materials may be used in the film, including, for example, metallic powders, carbon-based fillers such as carbon black, double-walled carbon nanotubes, multi-walled carbon nanotubes (MWNT), carbon nanofibers (CNF), and nickel coated SWNT, and other conductive fillers, including combinations of such fillers. Still other matrix materials and conductive filler materials may be used in various embodiments of the method. Accordingly, a wide variety of fiber/matrix composites can be manufactured using the method described herein. Further materials may be contained in the film and/or used in manufacturing the film, including various surfactants, such as sodium dodecyl sulfate (SDS) and dimethylformamide (DMF). FIG. 2 illustrates the chemical structures of PVP, SWNT, and SDS.

In another example, a composite film containing PVP and SWNTs is used to coat water soluble tooling material during processing. The composite film is manufactured using SDS to disperse the SWNTs in the PVP solution. A fiber-matrix system, such as infusible graphite/977-3 epoxy, graphite/cyanate ester, or a VARTM-compatible resin matrix, is selected for manufacturing using the water soluble tooling material. The fiber-matrix system may also contain an added toughener or other additional components. The fiber-matrix material is brought into contact with the tooling material to form the composite part, and is then autoclaved or processed using VARTM, depending on the nature of the fiber-matrix material. The finished composite part has an outer SWNT layer imparted by the PVP-SWNT film on the tooling material.

More specific examples of the fabrication and testing of films, composites, and other materials according to various embodiments of the disclosed method are described below. In general, the use of films in producing composites according to these examples did not affect surface quality of the finished composite components.

Example 1

A PVP-SWNT film was prepared using deionized (DI) water and sodium dodecyl sulfate (SDS) surfactant. In preparing the film, 23 mg of SDS was dissolved in ~100 mL DI water. SWNT (~23 mg) was added to the DI water/SDS solution and sonicated (using bath sonicator, Branson 3510) for about 10 hours. Separately, 2.26 g PVP was dissolved in 50 mL DI water. The SWNT dispersion was then added to PVP solution and the resulting PVP/SDS/SWNT (1 wt % SWNT with respect to PVP) dispersion was stirred by mechanical stirring overnight at room temperature. The dispersion was then poured onto a glass mold kept on a hot plate to facilitate fast removal of solvent. Once most of the water was evaporated, the film was peeled of the mold and kept in vacuum oven at ~100° C. for complete removal of water. It was found that the quality of nanotube dispersion in the PVP matrix appeared to be poor. Attempts to measure the electrical conductivity of this film did not succeed as the film resistance was higher than the instrument's measuring limit.

Example 2

Figure 3:
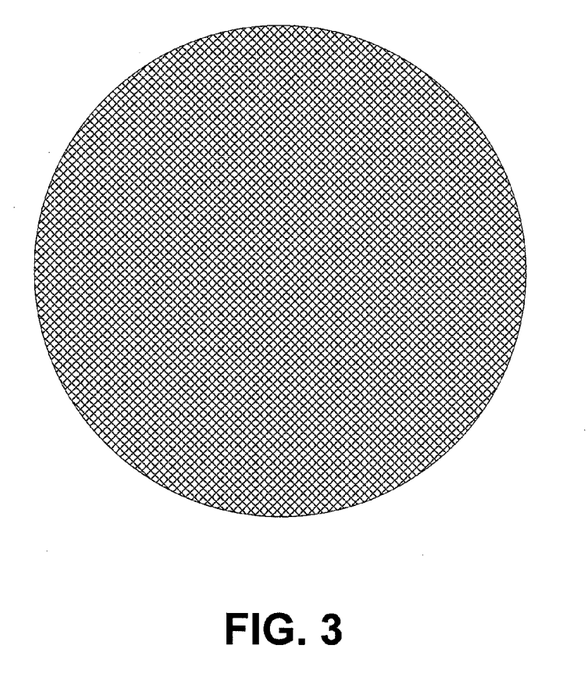
FIG. 3 is a photograph of a composite film containing polyvinyl pyrrolidone and single-walled carbon nanotubes.

A PVP/SWNT film was prepared by increasing the amount of SWNT to 5 wt % and increasing the ratio of carbon nanotubes to surfactant to 1:5. To improve the quality of dispersion, SWNT/SDS/DI water dispersion was first sonicated in a horn sonicator (Misonix 3000) for 30 minutes at 60 W followed by 2 hours sonication in bath sonicator. The dispersion was mixed with PVP/DI water solution and stirred at ~70° C. The solution was then cast on PTFE dish and kept in oven to facilitate fast evaporation of water. Once the film formed, it was peeled of the mold and dried in vacuum oven at 100° C. overnight. Thickness of this film was ~200 μm. FIG. 3 shows a photograph of the PVP-5 wt % SWNT composite film.

Figure 4:
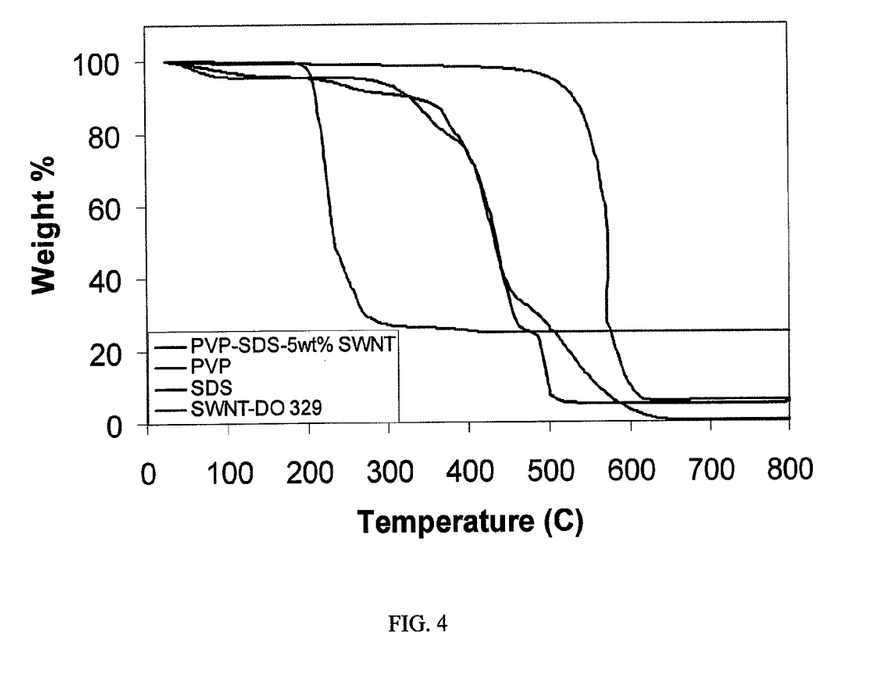
FIG. 4 is a graph illustrating a thermogravimetric analysis of a film containing polyvinyl pyrrolidone and single-walled carbon nanotubes.

The thermogravimetric analysis (TGA) curve of PVP-5 wt % SWNT composite film is given in FIG. 4, along with TGA curves for PVP, SDS, and SWNT. TGA experiments are performed under air at heating rate of 10° C./min. SDS exhibits a peak degradation temperature around 220° C. and leaves 25% residue. SWNT decomposes at ~570° C. The residue for SWNT is ~6%, from which actual metal impurity in the SWNT sample can be ascertained if the identity of the metal catalyst used is known.

Electrical conductivity of the PVP-5 wt % SWNT composite film was measured by a multimeter (Keithley Instrument) using a four point probe from Signatone. The electrical conductivity of this film was found to be ~0.138 S/m. For comparison, the electrical conductivity of VGCNF composites containing PMMA-5 wt % SWNT and PAN-5 wt % have been measured, in one example, to be 126 S/m and 0.7 S/m$^2$ respectively. The low value of conductivity for PVP/SWNT composite was taken as indicative of poor dispersion of carbon nanotubes in the polymer matrix.

Example 3

PVP/SWNT films and solutions containing 1% and 2% SWNT were fabricated, using DMF as a dispersant, and the electrical conductivity of the films were measured. DMF, when used as a surfactant/dispersant, has been shown to assist in improving the dispersion of SWNT in solution. PVP (K120, International Specialty Product) was provided by Advanced Ceramics Research. SWNT (grade XO 21UA) were purchased from CNI. DMF was obtained from Sigma-Aldrich Co., and used as received. In fabricating the PVP-1 wt % SWNT film, 40 mg of SWNT was added to ~600 mL DMF and sonicated (using a bath sonicator, Branson 3510) for ~16 hours at which point the dispersion appeared optically homogenous. Separately, 4 g PVP was dissolved in 50 mL DMF. The SWNT dispersion is than added to PVP solution and the resulting PVP/CNT/DMF (1 weight % SWNT with respect to PVP) dispersion is stirred by mechanical stirring under vacuum at ~80° C., to remove excess DMF. When the volume of PVP/CNT/DMF dispersion reduced to ~100-150 mL, the solution was poured onto PTFE molds and kept in a fume hood for removal of DMF and formation of film. The films were peeled off the PTFE mold and kept in vacuum oven at ~80° C. for 2-3 days for complete removal of solvent. The film thickness was ~107 μm. Composite film containing 2 wt % SWNT was prepared by the same procedure, producing a film having a thickness of ~90 μm.

Electrical conductivity of the films was measured by a multimeter (Keithley Instrument) using a four point probe from Signatone. The results are shown in Table 1.

TABLE 1

Electrical conductivity of PVP-SWNT composite films

| | Electrical Conductivity (S/m) |
|---|---|
| PVP + 1 wt % SWNT | 4.6 * 10$^{-3}$ |
| PVP + 2 wt % SWNT | 1.8 * 10$^{-2}$ |

Figure 5:
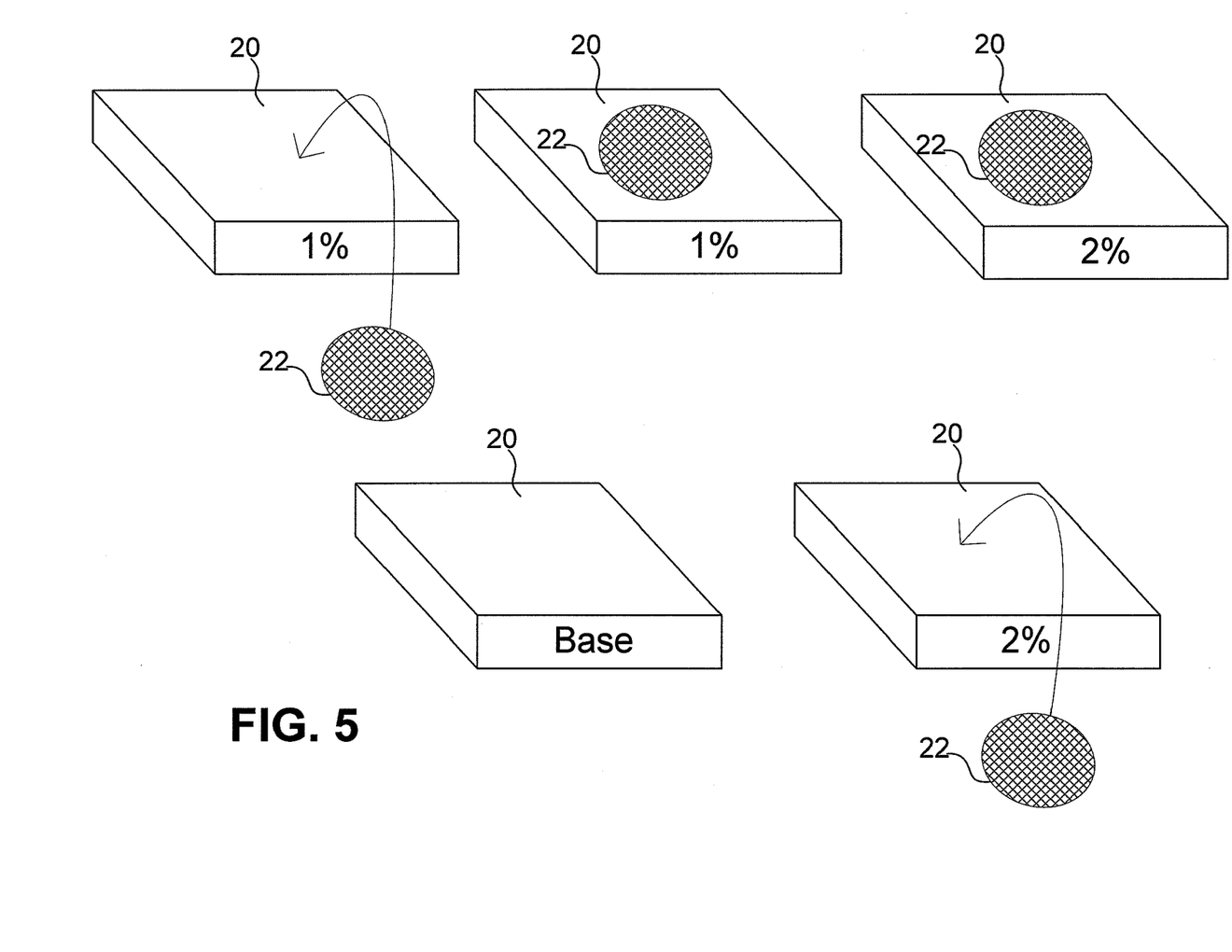
FIG. 5 is a photograph of water soluble tooling pieces and composite films containing polyvinyl pyrrolidone and single-walled carbon nanotubes, prior to application of the films to the tooling pieces.
Figure 6:
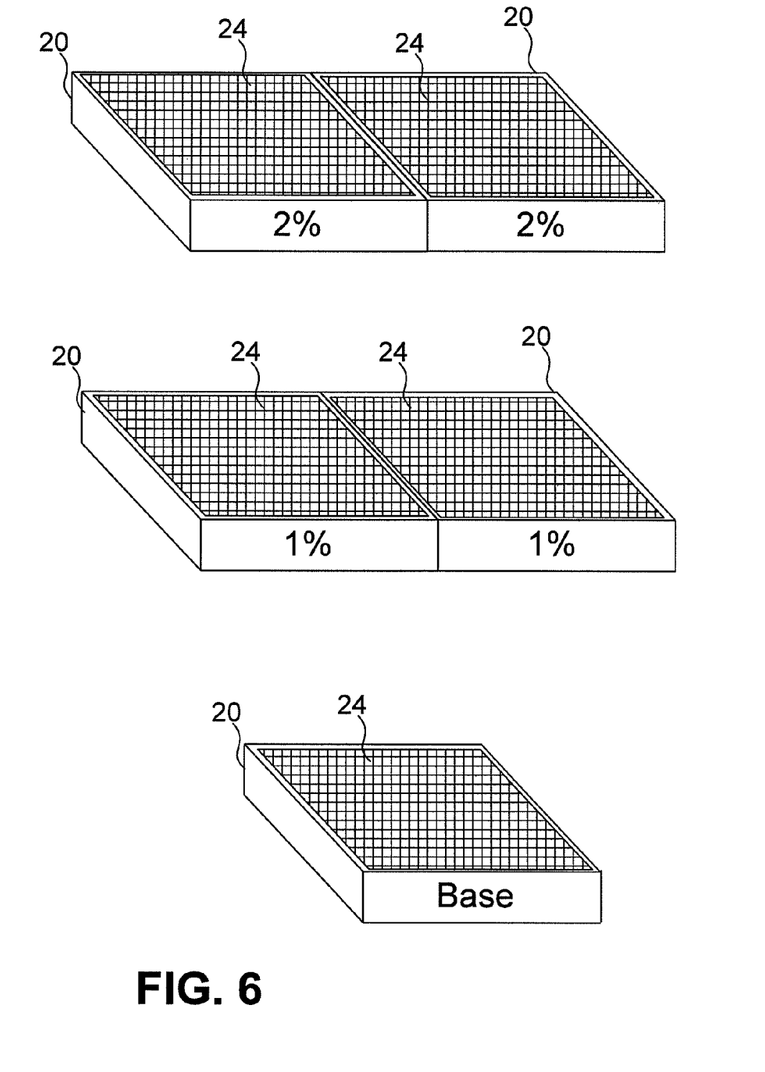
FIG. 6 is a photograph of the tooling pieces of FIG. 5, each having a film applied thereto and an epoxy-graphite prepreg laid up upon the tooling piece.
Figure 7:
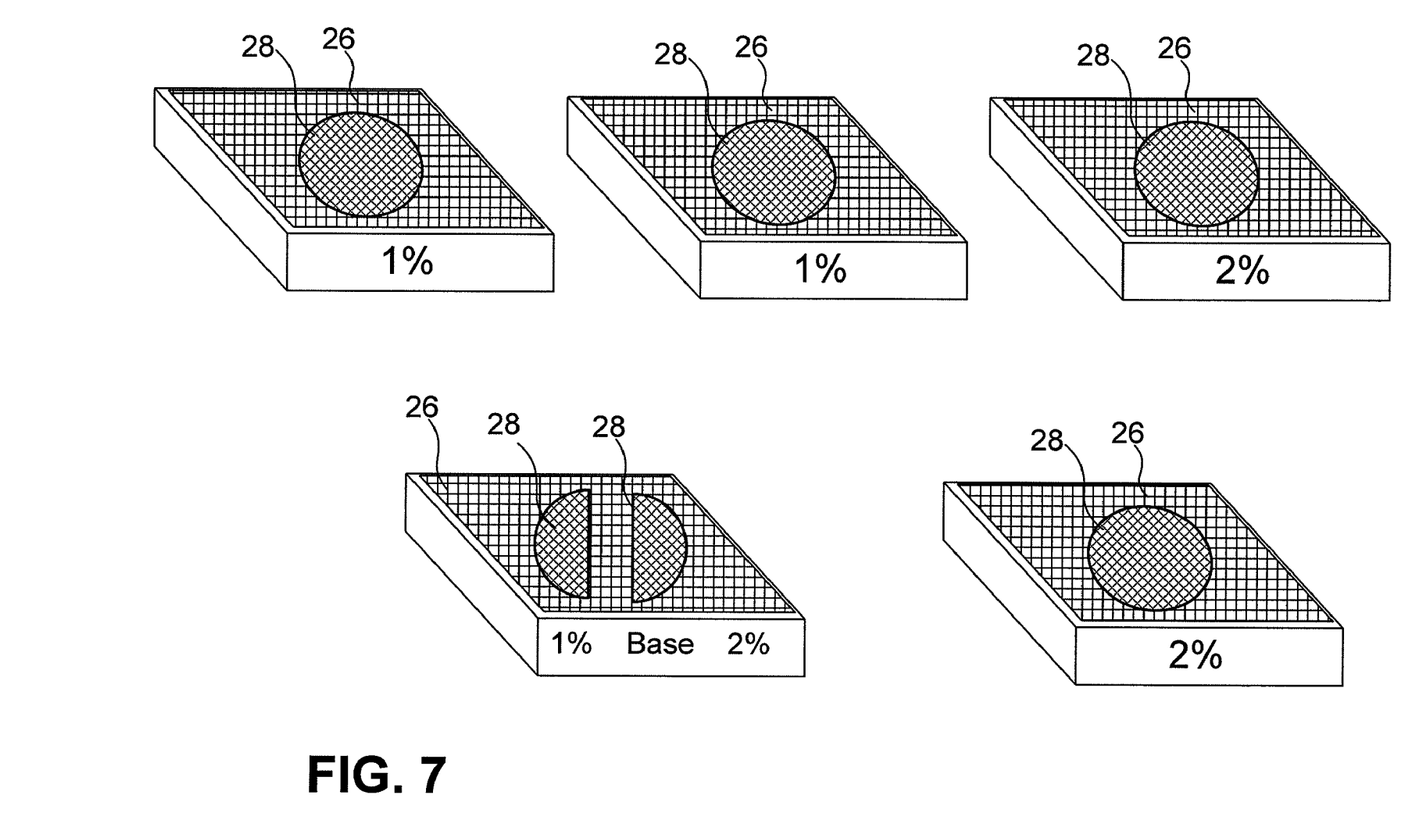
FIG. 7 is a photograph of composite panels made using the tooling pieces, films, and prepregs of FIGS. 5 and 6.
Figure 8:
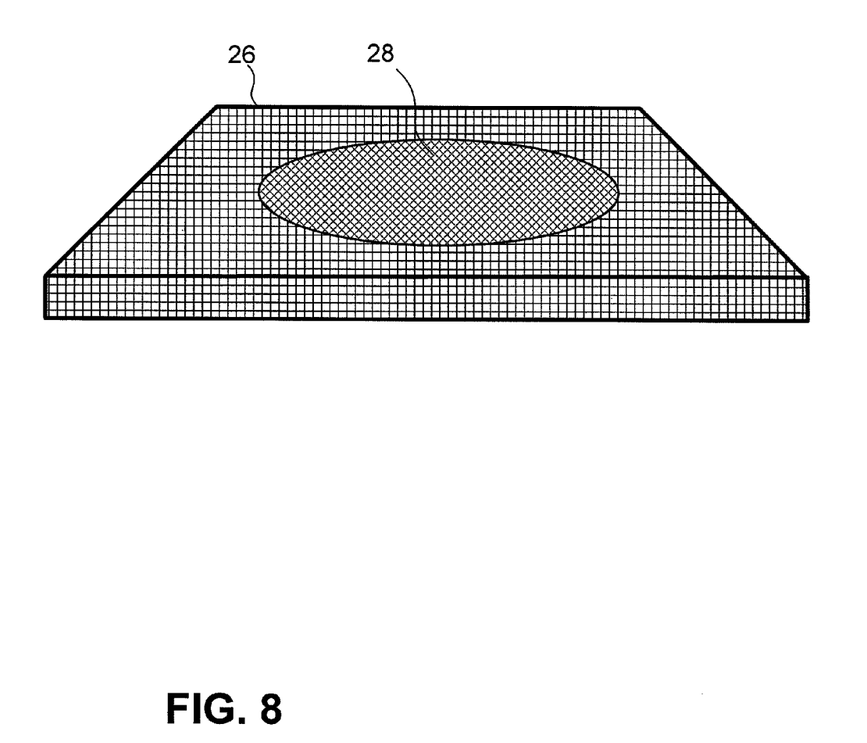
FIG. 8 is a close-up photograph of one of the composite panels of FIG. 7.

The films also were placed on the water-soluble tooling prior to the placement of the composite prepreg, and were used in manufacturing 8552 epoxy/graphite composite panels using water soluble tooling material. As shown in FIG. 5, water-soluble tooling pieces 20 were coated with a release agent and a sealant (Aquaseal). Composite PVP-SWNT films 22 having 3" diameter were applied to the tooling pieces 20. As shown in FIG. 6, prepregs 24 containing 8552 epoxy/graphite were laid up on top of the tooling pieces 20. The prepregs were then vacuum bagged and autoclaved. The composite panels 26 were stripped from the tooling pieces 20, as shown in FIGS. 7-8, producing a composite panel 26 with a conductive composite surface layer 28 thereon. It was observed that the films were completely transferred to the composite surface successfully.

The composite panels were characterized for electrical conductivity, similar to the SWNT films. The measured conductivity of the composite panels are shown in Table 2. The conductivity of the films was also measured, for comparison, and are shown in Table 2.

TABLE 2

Electrical conductivity of PVP-SWNT composite films

| | Electrical Conductivity | | | |
|---|---|---|---|---|
| | Film | | Composite | |
| Film type | Surface conductivity | Surface conductivity per unit thickness (100 μm) | Surface conductivity | Surface conductivity per unit thickness (~3 mm) |
| PVP + 1 wt % SWNT | 4.6 * 10$^{-3}$ (±0.9 * 10$^{-3}$) S/m | 43 S/m$^2$ | 6.8 * 10$^{-3}$ (±1.1 * 10$^{-3}$) S/m | 2.27 S/m$^2$ |
| PVP + 2 wt % SWNT | 1.8 * 10$^{-2}$ (±0.5 * 10$^{-2}$) S/m | 200 S/m$^2$ | 1.9 * 10$^{-2}$ (±0.6 * 10$^{-2}$) S/m | 6.33 S/m$^2$ |

It can be seen that the conductivity (S/m) of the films did not change appreciably after the composite processing, demonstrating that the processing did not adversely affect the conductivity of the SWNT film and destroy its properties. The conductivity per unit thickness of the composite was less than that of the film because of the thickness of the composite panel.

Example 4

Composite films containing PVP and multi-walled carbon nanotubes (MWNT) with 0.5% and 1 wt % MWNT were also prepared, using the method described in Example 3 above. However, attempts to measure the electrical conductivity of PVP/MWNT composite films did not succeed as the film resistance was higher than the instrument's measuring limit. These films were not used for composite fabrication.

Example 5

A PVP-SWNT solution was fabricated using SDS. SDS surfactant for this application was obtained from Fisher Scientific. In fabricating the film, 15 mg SWNT (XO 21 UA) was added to 100 mL of 1 wt % SDS solution in DI water and sonicated for ~10 hours. To this dispersion, 15 g PVP powder was added over a period of 1 hour while stirring. The solution was further stirred for 3-4 hours at room temperature. The dispersion was kept in vacuum oven at room temperature to remove the bubbles. The PVP content in the solution was ~15 wt %. The concentration of SWNT was 0.1 wt % with respect to PVP. A solution containing 0.5 wt % SWNT was also prepared. These solutions were not manufactured into films or tested.

Example 6

Composite films were prepared using polymethyl methacrylate (PMMA) and SWNT in compositions of 1 wt %, 5 wt %, and 15 wt % SWNT relative to PMMA. Table 3 illustrates the measured electrical conductivities of these films and composite parts manufactured using these films according to the methods described above.

TABLE 3

Electrical conductivity of PMMA-SWNT composite films

| | Electrical Conductivity | | | |
|---|---|---|---|---|
| | Film | | Composite | |
| Film type | Surface conductivity | Surface conductivity per unit thickness | Surface conductivity | Surface conductivity per unit thickness |
| PMMA + 1% SWNT | $4.23 * 10 - 2 \pm 0.04$ S/m | $1410$ S/m$^2$ (~30 μm) | $6.75 * 10 - 3 \pm 0.03$ S/m | $2.25$ S/m$^2$ (~3 mm) |
| PMMA + 5% SWNT | $0.45 \pm 0.1$ S/m | $19565$ S/m$^2$ (~23 μm) | $1.95 * 10^{-2} \pm 0.02$ S/m | $6.5$ S/m$^2$ |
| PMMA + 15% SWNT | $1.34 \pm 0.4$ S/m | $49630$ S/m$^2$ (~27 μm) | $4.04 * 10^{-2} \pm 0.02$ S/m | $13.46$ S/m$^2$ |

Example 7

Composite films were prepared using polyacrylonitrile (PAN) and SWNT in compositions of 5 wt %, 10 wt %, 20 wt %, and 40 wt % SWNT relative to PAN. Table 4 illustrates the measured electrical conductivities of these films and composite parts manufactured using these films according to the methods described above.

TABLE 4

Electrical conductivity of PAN-SWNT composite films

| | Electrical Conductivity | | | |
|---|---|---|---|---|
| | Film | | Composite | |
| Film type | Surface conductivity | Surface conductivity per unit thickness | Surface conductivity | Surface conductivity per unit thickness |
| PAN + 5% SWNT | $2.29 * 10^{-2} \pm 0.004$ S/m | $954$ S/m$^2$ (~24 μm) | N/A | N/A |
| PAN + 10% SWNT | $4.0 * 10^{-2} \pm 0.004$ S/m | $1600$ S/m$^2$ (~25 μm) | $1.82 * 10^{-2} \pm 0.007$ S/m | $6.07$ S/m$^2$ |
| PAN + 20% SWNT | $0.43 \pm 0.1$ S/m | $21500$ S/m$^2$ (~20 μm) | $0.208 \pm 0.09$ S/m | $69.33$ S/m$^2$ |
| PAN + 40% SWNT | $2.2 \pm 0.8$ S/m | $73333$ S/m$^2$ (~30 μm) | $0.613 \pm 0.17$ S/m | $204.33$ S/m$^2$ (~3 mm) |

Figure 9:
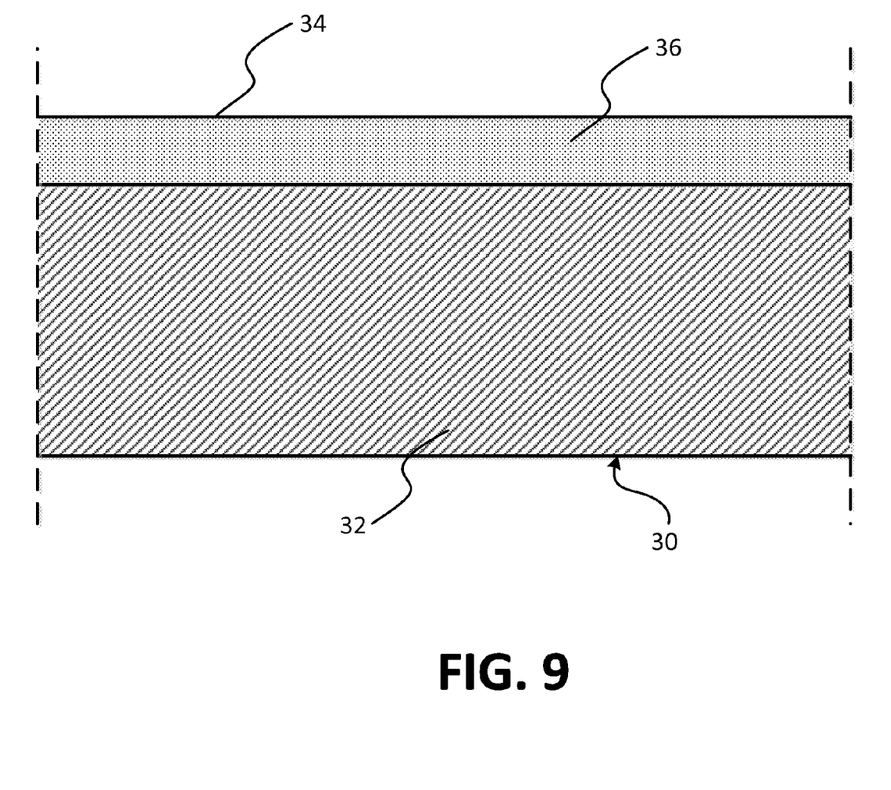
FIG. 9 is a cross-sectional view of one embodiment of a composite material.

The embodiments of the method described above can be used to produce multi-functional composite parts having increased EMI shielding effectiveness and increased surface conductivity, providing increased lightning strike mitigation. Additionally, the composite parts may have enhanced structural ability to withstand impact, thermal, acoustic, radiation, and EMI loads. FIG. 1 illustrates one example of such a composite part 14 having a conductive surface layer 16 containing conductive filler material, such as SWNT. FIGS. 7-8 illustrate another example of a composite part 26 with a conductive composite surface layer 28 containing conductive filler material. FIG. 9 illustrates a cross-section of a further example of a portion of a composite part 30 having a composite base material 32 with a composite surface layer 34 containing a conductive filler material 36.

Such composite parts can be manufactured with complex shapes for use in various applications. For example, such composite parts can be used in aerospace applications, including aircraft components and components for satellites and other space applications, as well as telecommunications applications. The enhanced EMI shielding, lightning strike mitigation, and other functional features of such multi-functional composite components are useful in these and other applications.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying claims.

What is claimed is:

1. A method for manufacturing a composite material comprising:
   forming a green composite component using a composite composition;
   introducing a composite film into contact with the surface of the green composite component, the composite film comprising a polymer material and a conductive filler material; and
   processing the composite composition to form a finished composite component, at a temperature sufficient to remove the polymer material from the composite film,
   wherein the finished composite component has a conductive surface layer comprising the conductive filler material.

2. The method of claim 1, wherein the processing is performed using a technique selected from the group consisting of: autoclaving, curing, and vacuum assisted resin transfer molding.

3. The method of claim 1, wherein the conductive filler material is a carbon-based material.

4. The method of claim 1, wherein the conductive filler material is selected from the group consisting of: single-walled carbon nanotubes, multi-walled carbon nanotubes, double-walled carbon nanotubes, nickel-coated single-walled carbon nanotubes, carbon nanofibers, carbon black, metallic powders, and combinations thereof.

5. The method of claim 1, wherein the polymer material of the composite film is selected from the group consisting of: polyvinylpyrrolidone, polymethyl methacrylate, polyacrylonitrile, and polyvinyl alcohol.

6. The method of claim 1, wherein the polymer material of the composite film comprises polyvinylpyrrolidone, and the processing temperature is above 175° C.

7. The method of claim 6, wherein most or all of the polymer material is removed during the processing.

8. The method of claim 1, wherein most or all of the polymer material is removed during the processing.

9. The method of claim 1, wherein all of the polymer material is removed during the processing.

10. The method of claim 1, wherein the composite film is introduced into contact with the surface of the green composite component by coating a surface of a tooling material with the composite film and introducing the green composite composition into contact with the surface of the tooling material.

11. The method of claim 1, wherein the tooling material is a water soluble tooling material, and the method further comprises removing the tooling material after the processing, using water.

12. A method for manufacturing a composite material comprising:
    forming a green composite component using a composite composition;
    introducing a composite film into contact with the surface of the green composite component, the composite film comprising a polymer material and a conductive filler material dispersed in the polymer material; and
    processing the composite composition to form a finished composite component, at a temperature sufficient to remove at least part of the polymer material from the composite film,
    wherein the finished composite component has a conductive surface layer comprising the conductive filler material.

13. The method of claim 12, wherein the processing is performed using a technique selected from the group consisting of: autoclaving, curing, and vacuum assisted resin transfer molding.

14. The method of claim 12, wherein the conductive filler material is a carbon-based material selected from the group consisting of: single-walled carbon nanotubes, multi-walled carbon nanotubes, double-walled carbon nanotubes, nickel-coated single-walled carbon nanotubes, carbon nanofibers, carbon black, metallic powders, and combinations thereof.

15. The method of claim 12, wherein the polymer material of the composite film is selected from the group consisting of: polyvinylpyrrolidone, polymethyl methacrylate, polyacrylonitrile, and polyvinyl alcohol.

16. The method of claim 12, wherein the polymer material of the composite film comprises polyvinylpyrrolidone, the processing temperature is above 175° C., and most or all of the polymer material is removed during the processing.

17. The method of claim 12, wherein most or all of the polymer material is removed during the processing.

18. The method of claim 12, wherein all of the polymer material is removed during the processing.

19. The method of claim 12, wherein the composite film is introduced into contact with the surface of the green composite component by coating a surface of a tooling material with the composite film and introducing the green composite composition into contact with the surface of the tooling material.

20. The method of claim 12, wherein the tooling material is a water soluble tooling material, and the method further comprises removing the tooling material after the processing, using water.

* * * * *